(12) United States Patent
Chung et al.

(10) Patent No.: US 11,039,720 B2
(45) Date of Patent: Jun. 22, 2021

(54) CLEANER

(71) Applicant: LG Electronics Inc., Seoul (KR)

(72) Inventors: Jaeheon Chung, Seoul (KR);
Seaunglok Ham, Seoul (KR)

(73) Assignee: LG Electronics Inc., Seoul (KR)

( * ) Notice: Subject to any disclaimer, the term of this patent is extended or adjusted under 35 U.S.C. 154(b) by 338 days.

(21) Appl. No.: 16/038,947

(22) Filed: Jul. 18, 2018

(65) Prior Publication Data

US 2019/0022872 A1  Jan. 24, 2019

(30) Foreign Application Priority Data

Jul. 18, 2017  (KR) .......................... 10-2017-0091130

(51) Int. Cl.
| | |
|---|---|
| *A47L 5/36* | (2006.01) |
| *A47L 9/28* | (2006.01) |
| *B25J 9/00* | (2006.01) |
| *B25J 13/08* | (2006.01) |
| *G05D 1/02* | (2020.01) |

(52) U.S. Cl.
CPC .............. *A47L 5/36* (2013.01); *A47L 9/2805* (2013.01); *A47L 9/2852* (2013.01); *B25J 9/0003* (2013.01); *B25J 13/088* (2013.01); *G05D 1/0238* (2013.01); *G05D 2201/0215* (2013.01)

(58) Field of Classification Search
CPC ......... B25J 13/088; B25J 9/0003; A47L 5/36; A47L 9/2852; A47L 9/2805; G05D 1/0238; G05D 2201/0215
See application file for complete search history.

(56) References Cited

U.S. PATENT DOCUMENTS

| | | |
|---|---|---|
| 6,226,830 B1 | 5/2001 | Hendriks et al. |
| 2009/0217478 A1* | 9/2009 | Chong ...................... A47L 5/36 15/319 |

FOREIGN PATENT DOCUMENTS

| | | |
|---|---|---|
| KR | 10-2015-0057476 | 5/2015 |
| KR | 101666903 | 10/2016 |

OTHER PUBLICATIONS

European Search Report in European Appln. No. 18183921.8, dated Dec. 13, 2018, 6 pages.

* cited by examiner

*Primary Examiner* — Basil T. Jos
(74) *Attorney, Agent, or Firm* — Fish & Richardson P.C.

(57) ABSTRACT

Disclosed is a cleaner including a first body having a cleaning unit, a second body configured to move autonomously, and a sensing module including at least one first sensor disposed on the first body and at least one second sensor disposed on the second body, the sensing module sensing a variable distance between the first sensor and the second sensor. Any one of a number of the at least one first sensor and a number of the at least one second sensor is two or more, and the sensing module senses two variable distances by two different combinations of one first sensor and one second sensor. The cleaner further includes a controller configured to control the second body to follow the first body based on the two variable distances.

20 Claims, 12 Drawing Sheets

CLEANER

CROSS-REFERENCE TO RELATED APPLICATION

This application claims the priority benefit of Korean Patent Application No. 10-2017-0091130, filed on Jul. 18, 2017 in the Korean Intellectual Property Office, the disclosure of which is incorporated herein by reference.

BACKGROUND OF THE INVENTION

1. Field of the Invention

The present invention relates to a cleaner that enables position following.

2. Description of the Related Art

There is known a cleaner that includes a cleaning part, which is held in a user's hand and is moved to clean a surface to be cleaned, and a main body part, which moves autonomously to follow the user. For example, technology in which, when the user grips and moves the cleaning part of the vacuum cleaner having a suction port, the main body part, which is connected to the cleaning part and provides suction force, moves autonomously to follow the user is known.

Prior Art Document (Korean Patent Laid-Open Publication No. 10-2015-0057476) discloses technology in which a camera provided on a main body captures an image of the position of a suction unit, the distance between the suction unit and a user is analyzed by analyzing the captured image, and the main body is moved toward the user by a drive unit of the main body when the analyzed distance becomes farther than a distance that is determined by the user.

PRIOR ART DOCUMENT

Patent Document

Korean Patent Laid-Open Publication No. 10-2015-0057476 (Published Date: May 28, 2015)

SUMMARY OF THE INVENTION

In the related art, in the case where the distance between the main body and the user is determined using the camera, accurate and consistent distance detection may be impossible because users may have different heights, body types, etc. Moreover, when another person, excluding the user who performs cleaning, occupies the same space, the main body may mistake the other person for the user, thereby failing to follow the user as intended. A first object of the present invention is to solve the problem described above, thereby realizing accurate position following technology.

In the related art, in the case where an obstacle is present in a straight path along which the main body tries to follow, for example, a suction port based on a detected position of the suction port, the movement of the main body may be limited, and collisions between the obstacle and the cleaner or other peripheral objects or interference between the obstacle and a suction hose or an electric cable may occur. A second object of the present invention is to solve the problem described above.

During following, the main body may back and forth from the zone that has been cleaned by the cleaning part and the zone that has not been cleaned, which causes the cleaned zone to again be contaminated by, for example, wheels of the main body, which are contaminated when passing through the zone that has not been cleaned. A third object of the present invention is to solve the problem described above.

In order to achieve the objects described above, in accordance with an aspect of the present invention, a cleaner includes a first body having a cleaning unit, a second body configured to move autonomously, and a sensing module. The sensing module includes at least one first sensor disposed on the first body and at least one second sensor disposed on the second body. The sensing module senses a variable distance between the first sensor and the second sensor. Any one of a number of the at least one first sensor and a number of the at least one second sensor is two or more. The sensing module senses two variable distances by two different combinations of one first sensor and one second sensor. The cleaner further includes a controller configured to control the second body to follow the first body based on the two variable distances.

The at least one first sensor or the at least one second sensor may include two sensors spaced apart from each other in a horizontal direction.

The controller may control a direction in which the second body moves based on the two variable distances.

The controller may estimate a movement path of the first body based on sensing of the two variable distances over time.

The controller may control the second body so as to move along the movement path.

Any one of the first sensor and the second sensor may include a transmitter that transmits a radio signal and a remaining one thereof may include a receiver that receives the radio signal. The variable distance may be sensed by transmission and reception of the radio signal.

The sensing module may include two first sensors.

The first body may be configured to secure a relatively wide cleaning area when moving to a front side thereof. The two first sensors may be spaced apart from each other in a left-and-right direction of the first body.

The controller may estimate a direction of orientation of the first body based on the two variable distances.

The controller may control a direction in which the second body moves based on the two variable distance that are repeatedly sensed and the direction of orientation that is repeatedly estimated while the second body moving.

The sensing module may include two second sensors.

The second body may be configured to perform straight movement to a front side thereof. The two second sensors may be spaced apart from each other in a left-and-right direction of the second body.

The controller may estimate a position of the first body relative to the second body based on the two variable distances.

The sensing module may be provided to sense the two variable distances over time. The controller may control the second body so as to move along a movement path of the first body when estimating that an increment of any one of the two variable distances per unit time is a predetermined reference or more.

The controller may control the second body so as to move along a shortened path when estimating that an increment of each of the two variable distances per unit time is below the predetermined reference and when estimating that there is a shortened path along which the second body follows the first body, the shortened path being shorter than the movement path of the first body.

BRIEF DESCRIPTION OF THE DRAWINGS

The above and other objects, features and other advantages of the present invention will be more clearly understood from the following detailed description taken in conjunction with the accompanying drawings, in which:

FIGS. 7 and 8 are elevational views of the upper surface of the cleaner 1 of FIG. 1, illustrating variation in two variable distances Ds1 and Ds2 depending on the movement of the first body 10, FIG. 7 illustrating a variable distance Ds1' sensed in the state in which no obstacle H is present between the first sensor 51a and the second sensor 56a, and FIG. 8 illustrating a variable distance Ds1'+a sensed in the state in which an obstacle H is present between the first sensor 51a and the second sensor 56a;

DETAILED DESCRIPTION OF THE PREFERRED EMBODIMENTS

Figure 7:
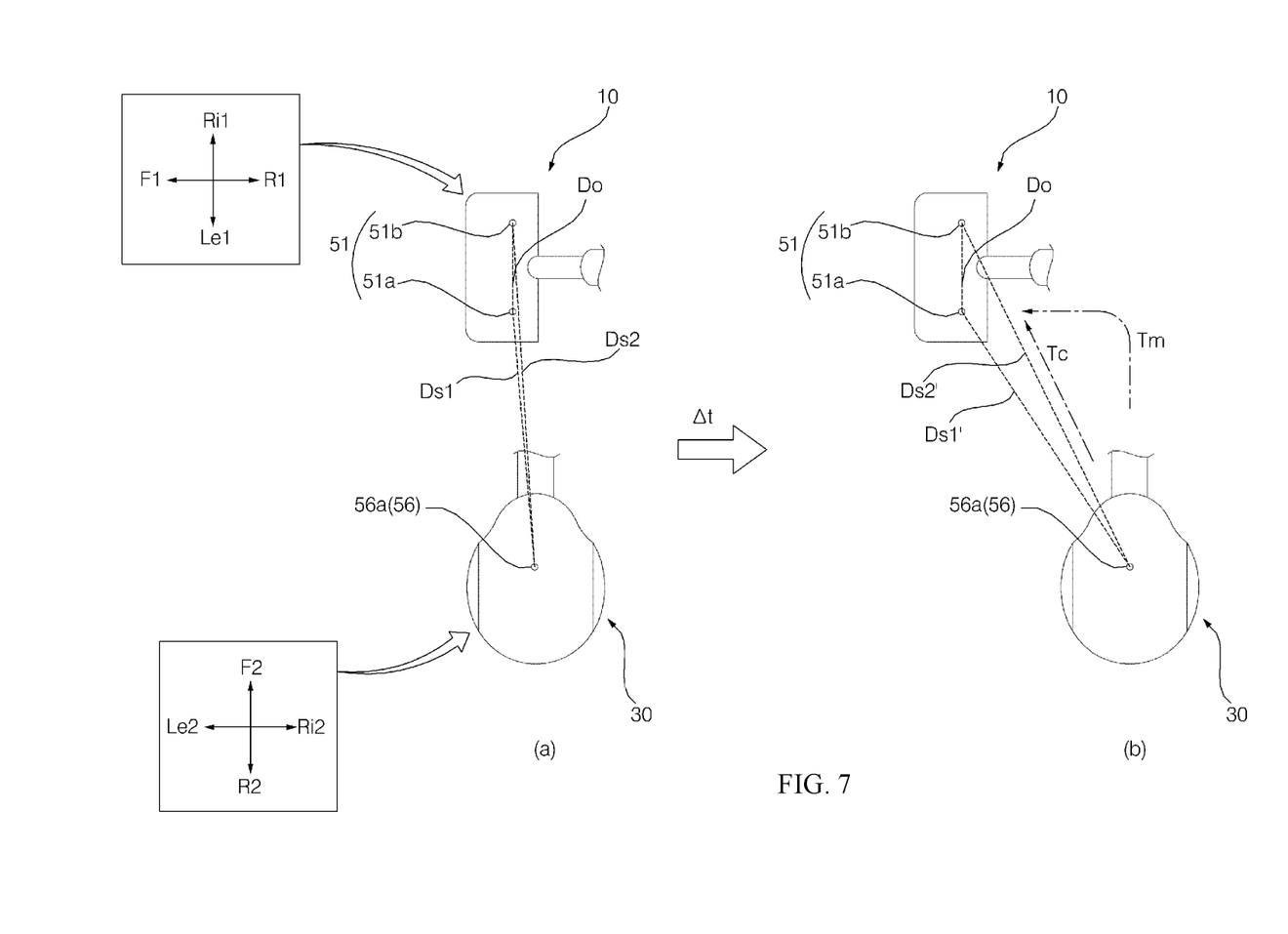

The expressions that designate directions mentioned below, such as "front/rear/left/right/upper/lower", may be defined on the basis of each of a first body 10 and a second body 30. As illustrated in FIG. 7, "the front side F1/the rear side R1/the left side Le1/the right side Ri1" of the first body 10 and "the front side F2/the rear side R2/the left side Le2/the right side Ri2" of the second body 30 may vary based on the direction of orientation of the first body 10 and on the direction of orientation of the second body 30. This is merely given for description to allow the present invention to be clearly understood, and the respective directions may of course be defined in different ways depending on where the criteria are placed.

The terms such as, for example, "first" and "second", which are affixed to the front of elements mentioned in the description, are merely used to distinguish the designated elements from each other, and are designated regardless of the order between the elements, the order of importance, a master-servant relationship, or the like.

In the description, in linguistic or mathematical magnitude comparison expressions, "equal to or less than (or less)" and "below (less than)" are interchangeable by those skilled in the art, "equal to or greater than (or more)" and "above (more than)" are interchangeable by those skilled in the art, and in the realization of the present invention, these interchanges are not problematic in achieving the effects of the present invention.

A cleaner of the present invention, designated by reference numeral 1, may be, for example, a vacuum cleaner or a damp-cloth cleaner. In one example, in which the cleaner 1 is a vacuum cleaner, the first body 10 may include a cleaning unit 11 having a suction member (not illustrated), which suctions contaminants from the floor, a connection unit 20 may include a suction hose 21, which moves the suctioned contaminants to the second body 30, and the second body 30 may include a suction motor (not illustrated) and a collection space (not illustrated), which accommodates the suctioned contaminants therein. The cleaning unit 11 of the vacuum cleaner 1 may have an agitator (not illustrated), which sweeps off the contaminants. In another example, in which the cleaner 1 is a damp-cloth cleaner, the first body 10 may include a cleaning unit 11 having a cloth member (not illustrated), which wipes the floor, the second body 30 may include a water reservoir (not illustrated), which stores therein water to be supplied to the cloth member, and a pump (not illustrated), and the connection unit 20 may include a water supply hose 21, which moves the water in the water reservoir to the cloth member. The cleaner 1 is not necessarily limited to the vacuum cleaner or the damp-cloth cleaner, and may be realized in any other device so long as it includes the first body 10 including the cleaning unit 11, which cleans a surface to be cleaned, and the second body 30, which follows the first body 10.

Figure 1:
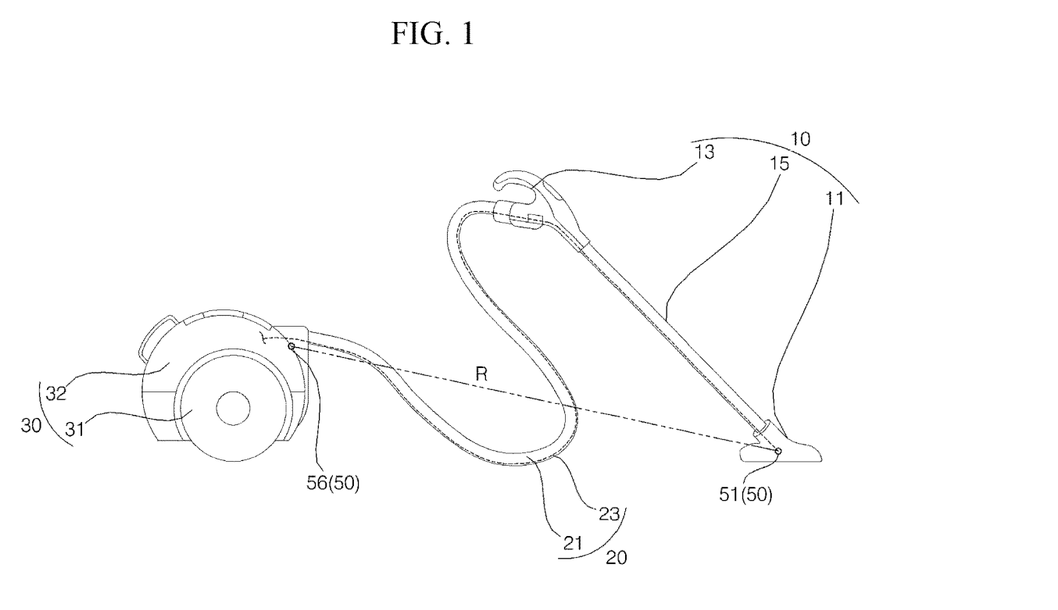
FIG. 1 is an elevational view of one side surface of a cleaner 1 according to an embodiment of the present invention.
Figure 2:
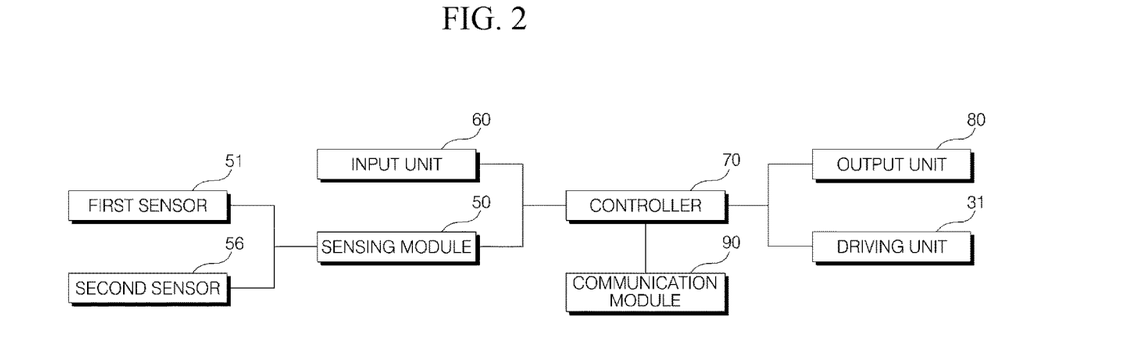
FIG. 2 is a control block diagram of the cleaner 1 illustrated in FIG. 1.

Referring to FIGS. 1 and 2, the cleaner 1 according to an embodiment of the present invention may include the first body 10, which allows a user to grip the same and move around. The cleaner 1 may include the second body 30, which performs autonomous movement. The cleaner 1 may include a sensing module 50, which senses the distance between the first body 10 and the second body 30. The cleaner 1 may include a controller 70, which controls the second body 30 so as to follow the first body 10.

In addition, the cleaner 1 may include the connection unit 20, which extends to interconnect the first body 10 and the second body 30. The cleaner 1 may include an input unit 60, which receives instructions from the user. The cleaner 1 may include an output unit 80, which outputs information regarding the current state and various cleaning modes. The cleaner 1 may include a communication module 90, which enables information exchange with another device or server.

The first body 10 may be handled by the user. The first body 10 may be referred to as a leading body. The first body 10 includes the cleaning unit 11, which cleans a surface to be cleaned. The first body 10 is configured to secure a relatively wide cleaning area when moving to the front side F1. To this end, the cleaning unit 11 has a length from the left side Le1 to the right side Ri1 that is longer than a length thereof from the front side F1 to the rear side R1. The first body 10 includes a handle 13 for the user to grip. The first body 10 includes a support member 15, which interconnects the handle 13 and the cleaning unit 11. In the state in which the user grips the handle 13, the handle 13 may support the support member 15, and the support member 15 may support the cleaning unit 11.

The second body 30 may move autonomously and may be configured to follow the first body 10. The second body 30 may be referred to as a following body. The second body 30 includes a driving unit 31, which moves the second body 30 relative to the surface to be cleaned. The driving unit 31 may move the second body 30 while being in contact with the floor. The driving unit 31 may include driving wheels. The left side Le2 and the right side Ri2 of the driving unit 31 may be symmetrical with each other. The second body 30 is configured to perform straight traveling to the front side F2, to perform rotation in place, and to perform turning to the left side Le2 and turning to the right side Ri2. The second body 30 includes a case 32, which defines the external appearance and accommodates inner elements such as the controller 70 therein. The case 32 may be supported by the driving wheels. The second body 30 may include a power supply (not illustrated), which supplies power. The power supply may include a plug, which is connected to an external socket, and/or a battery.

The sensing module 50 includes at least one first sensor 51 disposed on the first body 10 and at least one second sensor 56 disposed on the second body 30. The number of any one selected from among the first sensors 51 and the second sensors is two or more. The cleaner 1 according to a first embodiment includes two first sensors 51a and 51b and one second sensor 56a, and the cleaner 1 according to a second embodiment includes one first sensor 51a and two second sensors 56a and 56b. The sensing module 50 senses the variable distance between the first sensor 51 and the second sensor 56. Because any one of the at least one first sensor 51 and the at least one second sensor 56 is at least two or more in number, at least two variable distances Ds1 and Ds2 are sensed.

The sensing module 50 senses two variable distances Ds1 and Ds2. The sensing module 50 senses the two variable distances by two different combinations of one first sensor 51 and one second sensor 56. In the first embodiment, the two different combinations include a first combination of the first sensor 51a and the second sensor 56a and a second combination of the first sensor 51b and the second sensor 56a. In the second embodiment, the two different combinations include a first combination of the first sensor 51a and the second sensor 56a and a second combination of the first sensor 51a and the second sensor 56b.

Any one of the first sensor 51 and the second sensor 56 includes a transmitter that transmits a radio signal R, and the other one thereof includes a receiver that receives the radio signal R. The variable distances Ds1 and Ds2 are sensed by the transmission and reception of the radio signal R. The transmitter and the receiver may respectively be referred to as an anchor and a tag. The transmitter may include an antenna that transmits the radio signal R, and the receiver may include an antenna that receives the radio signal R. In one example, the first sensor 51 may include the transmitter and the second sensor 56 may include the receiver. In another example, the second sensor 56 may include the transmitter and the first sensor 51 may include the receiver.

In the present embodiment, the first sensor 51 is disposed on the cleaning unit 11. Although not illustrated, in another embodiment, the first sensor 51 may be disposed on the handle 13. In the present embodiment, the second sensor 56 is disposed on the surface of the case 32 on the front side F2 thereof.

The radio signal R may be a radio frequency (RF) signal that is transmitted in a wireless manner by the transmitter. The radio signal R may be an ultra-wide-band (UWB) signal.

The connection unit 20 includes a connection hose 21, which interconnects the first body 10 and the second body 30. The connection hose 21 may be the suction hose or the water supply hose. The connection unit 20 may include a transmission line 23, which is electrically connected to the first sensor 51. When the first sensor 51 includes the receiver, the transmission line 23 may transmit a sensed signal of the first sensor 51 to the controller 70. When the first sensor 51 includes the transmitter, the controller 70 may transmit a command signal to the first sensor 51 through the transmission line 23. The transmission line 23 may extend so as to interconnect the first body 10 and the second body 30.

The controller 70 may receive input information from the input unit 60. The controller 70 may control the output unit 80 so as to output information. The controller 70 may receive information received by the communication module 90. The controller 70 may control the communication module 90 so as to transmit information outward.

The controller 70 may receive information regarding the sensed variable distances Ds1 and Ds2 from the sensing module 50. The controller 70 may control any one of the first sensor 51 and the second sensor 56, which includes the transmitter, so as to transmit the radio signal R. The controller 70 may receive sensed information (the two variable distances), which is acquired by receiving the radio signal R from the other one of the first sensor 51 and the second sensor 56, which includes the receiver.

The controller 70 processes the two received variable distances Ds1 and Ds2. The controller 70 may estimate the direction Fa of orientation of the first body 10 based on the two variable distances Ds1 and Ds2. The controller 70 may estimate the position of the first body 10 relative to the second body 30 based on the two variable distances Ds1 and Ds2. The controller 70 may estimate the distance from the first body 10 to the second body 30 based on the two variable distances Ds1 and Ds2. The controller 70 may estimate the direction Ra of the first body 10 relative to the second body 30 based on the two variable distances Ds1 and Ds2. The controller 70 may estimate the movement path Tm of the first body 10 based on the two variable distances Ds1 and Ds2 sensed over time.

The controller 70 controls the driving of the driving unit 31 of the second body 30. The controller 70 may control the second body 30 so as to follow the first body 10 based on the two variable distances Ds1 and Ds2. The controller 70 may control the second body 30 so as to move along the movement path Tm of the first body 10. The controller 70 may control the second body 30 so as to follow the first body 10 along a shortened path Tc, which will be described below.

The controller 70 may control the direction in which the second body 30 moves based on the two variable distances Ds1 and Ds2. The controller 70 controls the straight movement and the rotation (rotation in place or turning) of the second body 30. The controller 70 may select any one of the straight movement and the rotation of the second body 30 at any one point in time.

Referring to FIGS. 3 to 6, the variable distances Ds1 and Ds2 mean information that is sensed and taken as the distance between the first sensor 51 and the second sensor 56. The variable distance Ds1 is information regarding the sensed distance between the first sensor 51 and the second sensor 56, which are combined in one manner, and the variable distance Ds2 is information regarding the sensed distance between the first sensor 51 and the second sensor 56, which are combined in another manner.

Figure 3:
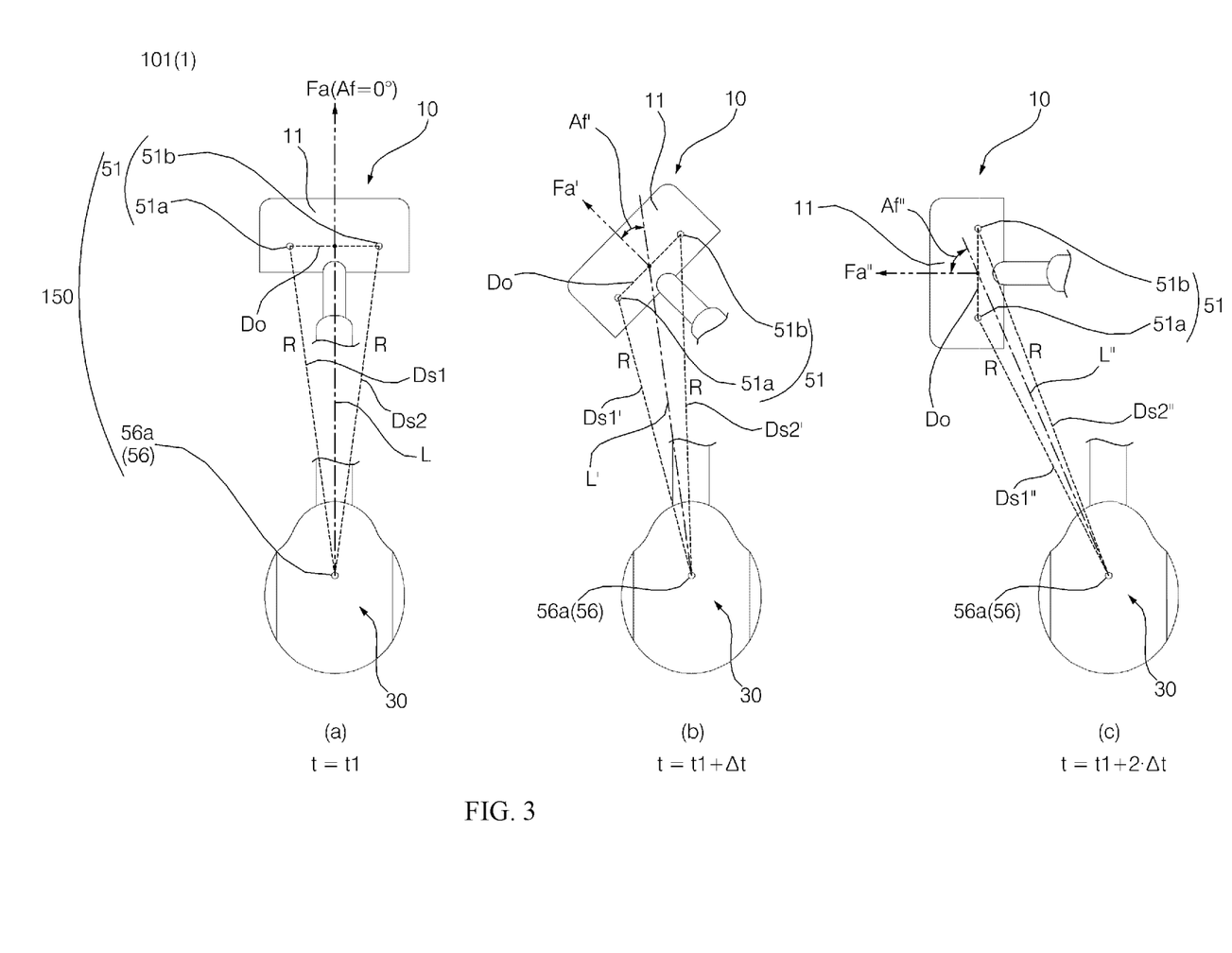
FIG. 3 is an elevational view of the upper surface of the cleaner 1 having sensing modules 51a, 51b and 56b according to a first embodiment, illustrating variation in two variable distances Ds1 and Ds2 depending on the movement of a first body 10.
Figure 5:
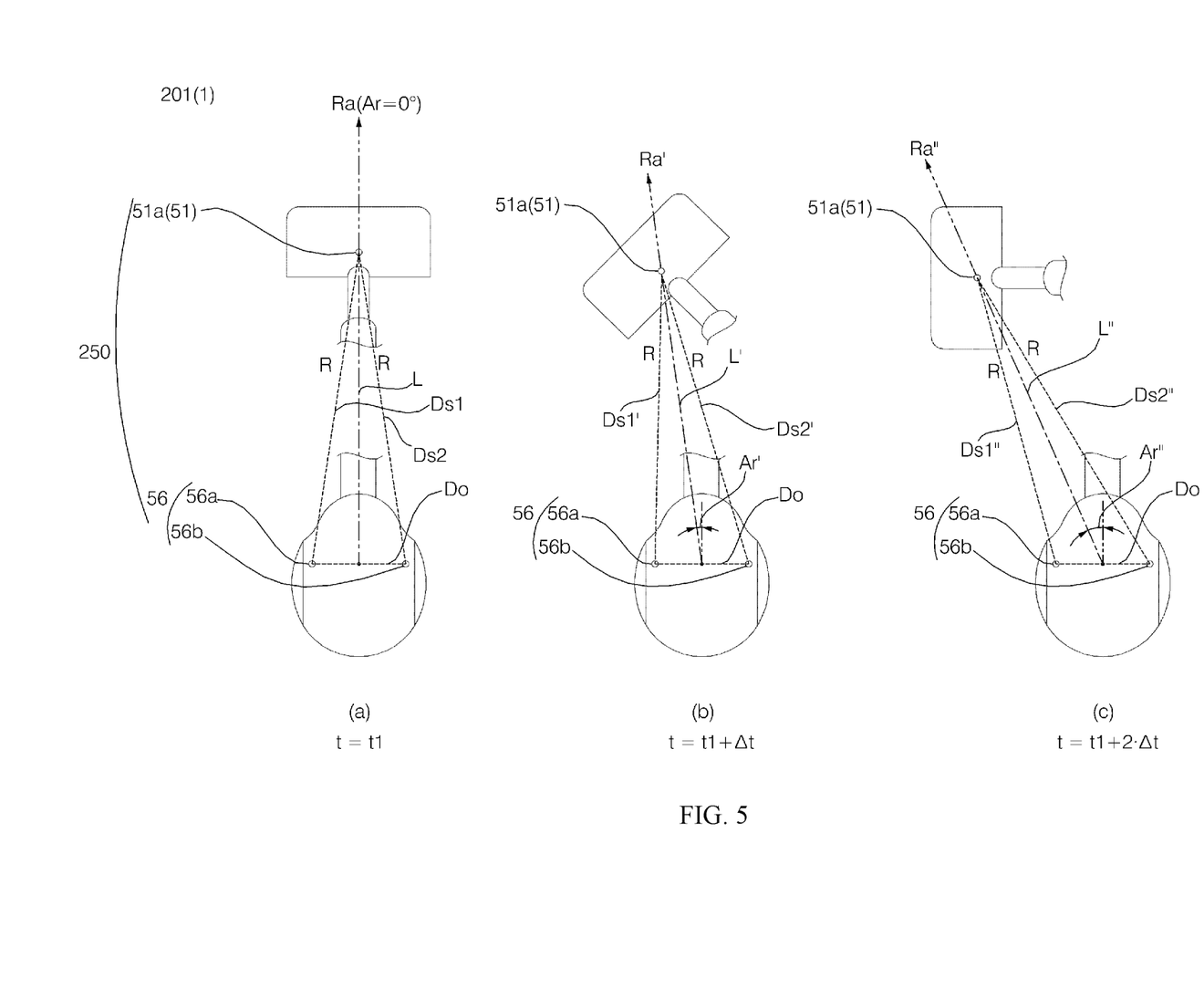
FIG. 5 is an elevational view of the upper surface of the cleaner 1 having sensing modules 51a, 56a and 56b according to a second embodiment, illustrating variation in two variable distances Ds1 and Ds2 depending on the movement of the first body 10.

The sensing module 50 is configured to sense the two variable distances Ds1 and Ds2 over time t. In one example, the sensing module 50 may sense two variable distances Ds1 and Ds2 successively in time. In another example, the sensing module 50 may sense two variable distances Ds1 and Ds2 at a periodic time interval. In FIGS. 3(*a*) and 5(*a*), two variable distances Ds1 and Ds2 sensed at any one point in time t1 are illustrated. In FIGS. 3(*b*) and 5(*b*), two variable distances Ds1' and Ds2' sensed at any one point in time t1+Δt after the point in time t1 are illustrated. In FIGS. 3(*c*) and 5(*c*), two variable distances Ds1" and Ds2" sensed at any one point in time t1+2·Δt after the point in time t1+Δt are illustrated. The two sensed variable distances vary over time while the first body 10 moving.

Figure 4:
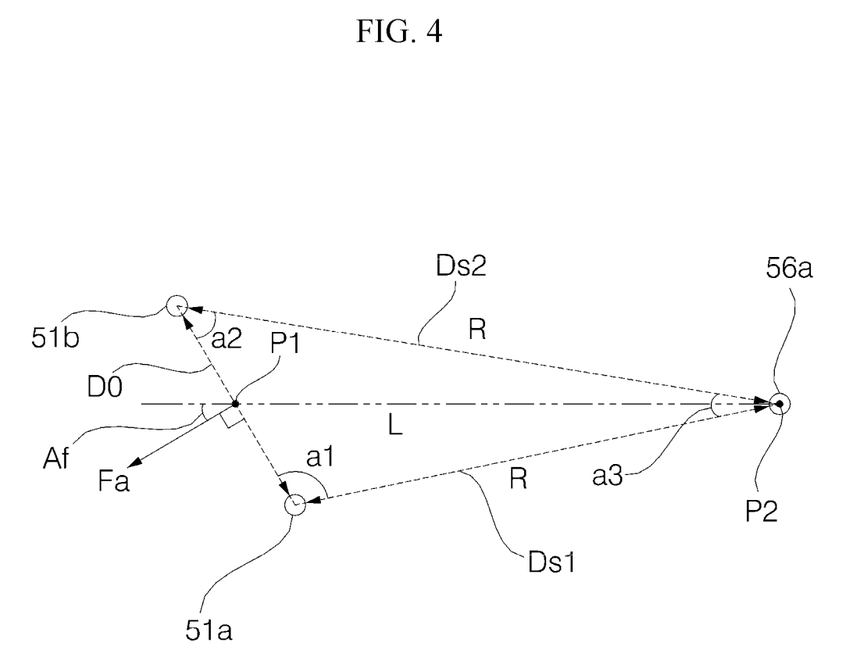
FIG. 4 is a conceptual view illustrating the positional relationship between two first sensors 51a and 51b and a second sensor 56b of FIG. 3 in the horizontal plane.

Referring to FIGS. 3 and 5, two sensors of any one type of the at least one first sensor 51 and the at least one second sensor 56 are spaced apart from each other in the horizontal direction. The distance between the two sensors of any one type spaced apart from each other is defined as a fixed distance Do. The two sensors of any one type are disposed at fixed positions, and thus the fixed distance Do is invariable. In addition, the fixed distance Do is not a sensed value, but a preset value. Referring to FIG. 3, in the first embodiment, two first sensors 51*a* and 51*b* are spaced apart from each other in the horizontal direction (the left-and-right direction of the first body 10) by the fixed distance Do. Referring to FIG. 4, in the second embodiment, two second sensors 56*a* and 56*b* are spaced apart from each other in the horizontal direction (the left-and-right direction of the second body 30) by the fixed distance Do.

Figure 6:
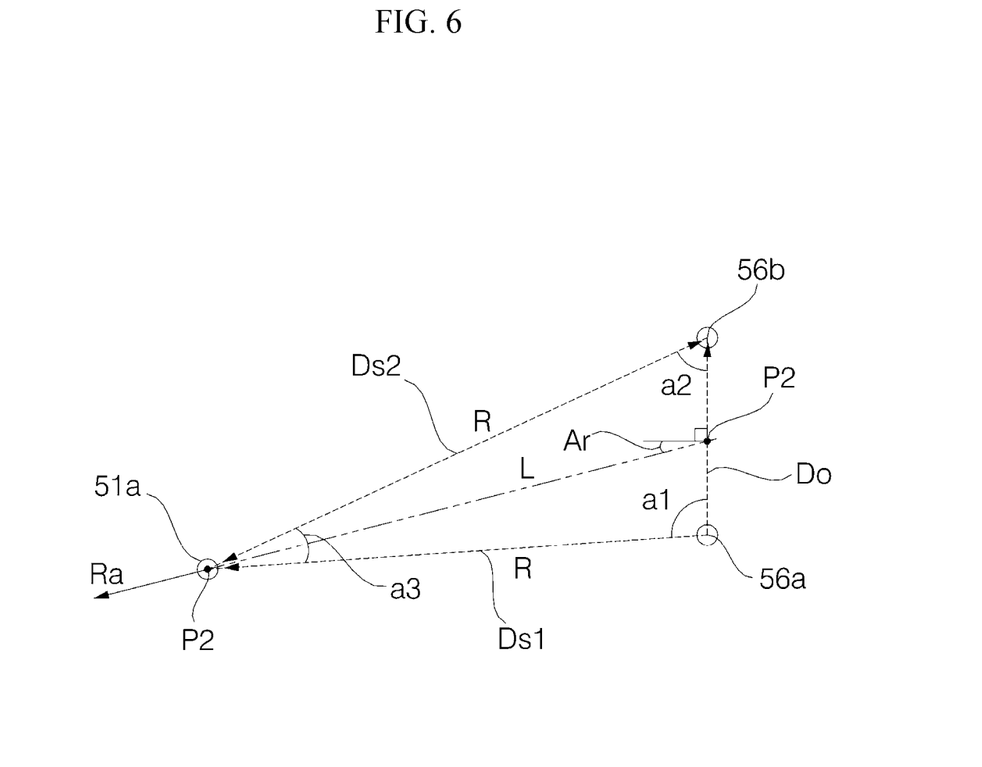
FIG. 6 is a conceptual view illustrating the positional relationship between a first sensor 51a and two second sensors 56a and 56b of FIG. 5 in the horizontal plane.

Referring to FIGS. 4 and 6, when the preset fixed distance Do and the two sensed variable distances Ds1 and Ds2 are input, only one triangle having three sides Do, Ds1 and Ds2 is determined. Information processing may be performed under the assumption that the fixed distance Do and the two variable distances Ds1 and Ds2 are distances in one horizontal plane. When the preset fixed distance Do and the two sensed variable distances Ds1 and Ds2 are input, the magnitudes of three angles a1, a2 and a3 of the triangle may be determined. Information processing may be performed under the assumption that the angles a1, a2 and a3 are angles in the horizontal plane. In addition, when the preset fixed distance Do and the two sensed variable distances Ds1 and Ds2 are input, the relative distance L between the second body 30 and the first body 10 is determined. Information processing may be performed under the assumption that the relative distance L is the distance in the horizontal plane.

Although the relative distance L may be understood in different ways depending on whether it means the distance between any one point on the first body 10 and any one point on the second body 30, in the present embodiment with reference to FIGS. 4 and 6, the relative distance L is illustrated as being the distance between one point P1 on the first body 10 and one point P2 on the second body 30. In the first embodiment, described with reference to FIG. 4, the point P1 is an intermediate point between two first sensors 51*a* and 51*b*, and the point P2 corresponds to the position of the second sensor 56*a*. In the second embodiment, described with reference to FIG. 6, the point P1 corresponds to the position of the first sensor 51*a*, and the point P2 is an intermediate point between two second sensors 56*a* and 56*b*. In FIGS. 3 to 6, in order to represent the length of the relative distance L, the double-dot line that interconnects the first body 10 and the second body 30 may be defined as a virtual "reference line". The reference line may be assumed as being disposed in the horizontal plane.

A cleaner 101 according to the first embodiment will be described below with reference to FIGS. 3 and 4. A sensing module 150 according to the first embodiment includes two first sensors 51*a* and 51*b*. The sensing module 150 includes the second sensor 56*a*. The two first sensors 51*a* and 51*b* are spaced apart from each other on the left side Le1 and the right side Ri1 of the first body 10.

As the sensing module 150 senses the variable distances Ds1 and Ds2 once at one point in time t1, it is possible to estimate the relative distance L at the point in time t1. In addition, as the sensing module 150 senses the variable distances Ds1 and Ds2 once at one point in time t1, it is possible to estimate the direction Fa of orientation at the point in time t1.

The controller 70 may estimate the direction Fa of orientation of the first body 10 based on the two variable distances Ds1 and Ds2. The direction of orientation Fa, Fa' or Fa" may mean the direction relative to the virtual reference line. The direction of orientation Fa, Fa' or Fa" may be estimated as the direction having an orientation angle Af, Af' or Af" relative to the virtual reference line.

The estimated value of the direction Fa of orientation may vary over time. Referring to FIG. 3(*a*), based on the variable distances Ds1 and Ds2 at the point in time t1, the direction Fa of orientation is estimated as the direction having the angle Af (zero degrees) relative to the virtual reference line. Referring to FIG. 3(*b*), based on the variable distances Ds1' and Ds2' at the point in time t1+Δ1, the direction Fa' of orientation is estimated as the direction having the angle Af' relative to the virtual reference line. Referring to FIG. 3(*c*), based on the variable distances Ds1" and Ds2" at the point in time t1+2·Δt, the direction Fa" of orientation is estimated as the direction having the angle Af" relative to the virtual reference line. The relative distance L, L' or L" is estimated at the point in time t1, t1+Δ1 or t1+2·Δt.

The controller 70 may control the direction in which the second body 30 moves based on the two variable distances and the direction of orientation, which are repeatedly sensed and estimated while the second body 30 moving. A concrete example of controlling the movement direction of the second body 30 according to the first embodiment will be described below. First, two variable distances Ds1 and Ds2 are sensed at any one point in time t1 so that the relative distance L and the direction Fa of orientation are estimated at the point in time t1. After the point in time t1, the two variable distances Ds1 and Ds2 are repeatedly sensed while the second body 30 moving, and thus, the relative distance and the direction of orientation are repeatedly estimated. Based on the extent to which the relative distance and the direction of orientation vary over time, the position of the first body 10 relative to the second body 30 is estimated. In addition, the movement path Tm of the first body 10 may be estimated. In addition, the direction in which the second body 30 is oriented on the basis of the first body 10 is estimated. Thereby, the controller 70 may determine the direction in which the second body 30 needs to move in order to follow the first body 10.

A cleaner 201 according to the second embodiment will be described below with reference to FIGS. 5 and 6. A sensing module 250 according to the second embodiment includes two second sensors 56*a* and 56*b*. The sensing module 250 includes the first sensor 51*a*. The two second sensors 56*a* and 56*b* are spaced apart from each other on the left side Le2 and the right side Ri2 of the second body 30.

The sensing module 250 may sense the position of the first body 10 relative to the second body 30 at one point in time t1 by sensing the variable distances Ds1 and Ds2 once at the point in time t1. In addition, when the sensing module 250 senses the variable distances Ds1 and Ds2 once at the point in time t1, it is possible to estimate the relative distance L at the point in time t1. In addition, when the sensing module 250 senses the variable distances Ds1 and Ds2 once at the point in time t1, it is possible to estimate the direction of the first body 10 relative to the second body 30 at the point in time t1.

The controller 70 may estimate the relative position based on the two variable distances Ds1 and Ds2. The relative position is combined information of the relative distance L and the relative direction Ra. The relative direction Ra, Ra' or Ra" may mean the direction of the virtual reference line relative to the front side F2 of the second body 30. The relative direction Ra, Ra' or Ra" may be estimated as the direction of the virtual reference line having a relative angle Ar, Ar' or Ar" relative to the front side F2 of the second body 30.

The estimated value of the relative direction Ra may vary over time. Referring to FIG. 5(a), based on the variable distances Ds1 and Ds2 at the point in time t1, the relative direction Ra is estimated as the direction of the virtual reference line having the angle Ar (zero degrees) relative to the front side F2 of the second body 30. Referring to FIG. 5(b), based on the variable distances Ds1' and Ds2' at one point in time t1+Δ1, the relative direction Ra' is estimated as the direction of the virtual reference line having the angle Ar' relative to the front side F2 of the second body 30. Referring to FIG. 5(c), based on the variable distances Ds1" and Ds2" at one point in time t1+2·Δt, the relative direction Ra" is estimated as the direction of the virtual reference line having the angle Ar" relative to the front side F2 of the second body 30. The relative distance L, L' or L" is estimated at the point in time t1, t1+Δ1 or t1+2·Δt. The position of the first body 10 relative to the second body 30 is estimated at the point in time t1, t1+Δ1 or t1+2·Δt.

The controller 70 may control the direction in which the second body 30 moves based on the two variable distances and the relative position, which are repeatedly sensed and estimated while the second body 30 moving. In addition, the controller 70 may estimate the movement path Tm of the first body 10 based on the repeatedly estimated relative position. A concrete example of controlling the movement direction of the second body 30 according to the second embodiment will be described below. First, two variable distances Ds1 and Ds2 are sensed at any one point in time t1 so that the relative position at the point in time t1 is estimated. The relative position may be estimated by processing the relative distance and the relative direction, which are estimated based on the two variable distances, or may be directly estimated from the two variable distances. After the point in time t1, the two variable distances are repeatedly sensed, and thus, the relative position is repeatedly estimated. In addition, the movement path Tm of the first body 10 may be estimated. Thereby, the controller 70 may determine the direction in which the second body 30 needs to move in order to follow the first body 10.

Figure 8:
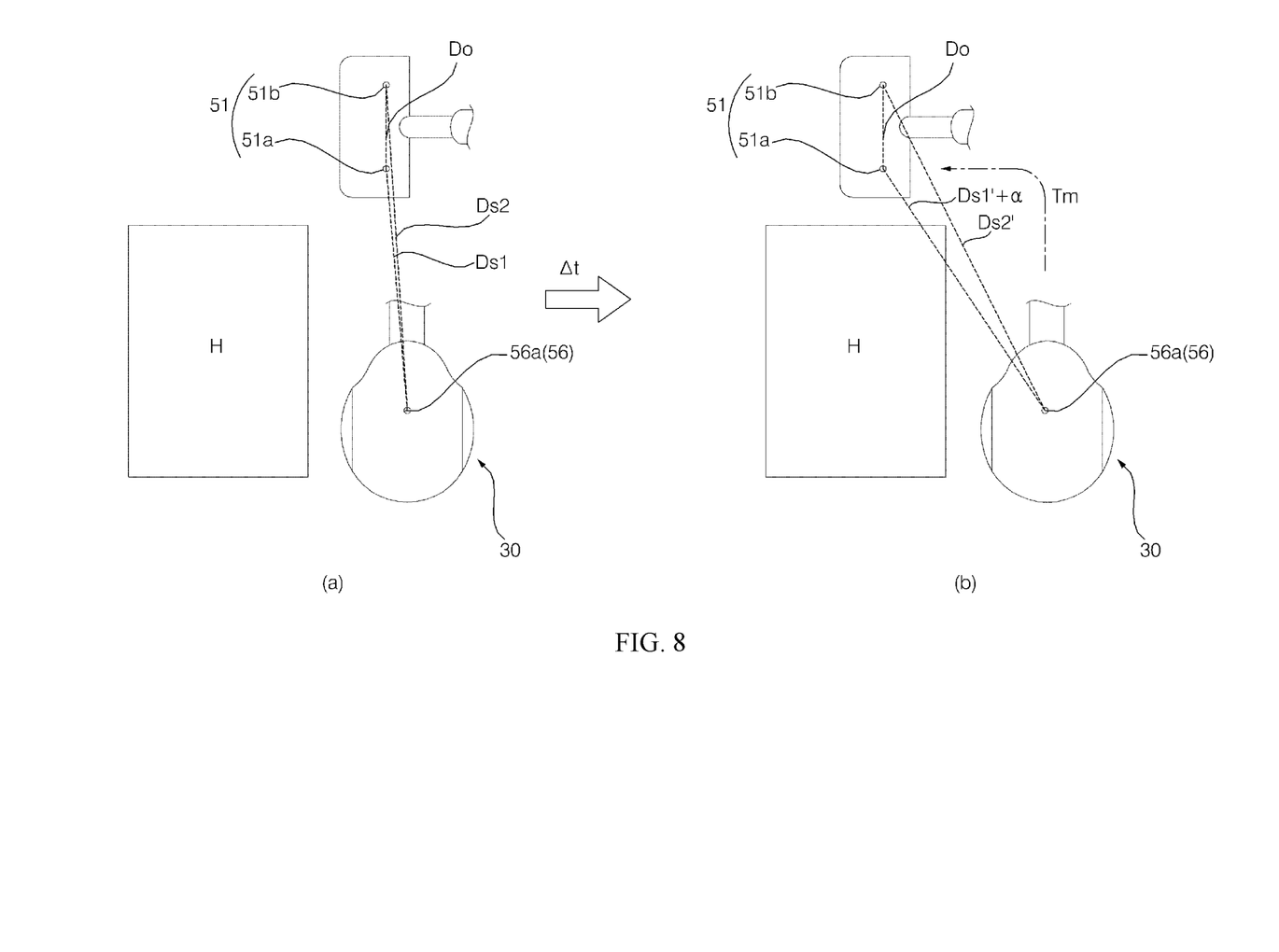

Referring to FIGS. 7 and 8, the controller 70 may perform a tracking mode of inducing the second body 30 to move along the estimated movement path Tm of the first body 10. The controller 70 may perform a shortcut mode of inducing the second body 30 to move so as to follow the first body 10 along a shortened path Tc, which is shorter than the movement path Tm. The controller 70 may induce the second body 30 to move by selecting any one of the tracking mode and the shortcut mode depending on whether or not a preset condition is satisfied. Any one of the tracking mode and the shortcut mode may be selected by user input through the input unit 60. The following description is based on an embodiment in which any one of the tracking mode and the shortcut mode is selected depending on whether or not a preset condition is satisfied.

Referring to FIG. 8, the controller 70 may control the second body 30 so as to move along the movement path Tm of the first body 10 when a first predetermined condition is satisfied based on the increment of any one of the two variable distances per unit time. The first predetermined condition may be the condition in which the increment of any one of the two variable distances per unit time $\Delta Ds1/\Delta t$ or $\Delta Ds2/\Delta t$ is a predetermined value V or more (see FIG. 10). That is, the controller 70 may control the second body 30 so as to move along the movement path Tm when it is estimated that the increment of any one of the two variable distances per unit time is a predetermined reference or more. When the variable distance steeply increases to the predetermined reference or more, it is conceivable that an obstacle H exists in the section that corresponds to the steeply increased variable distance. Thus, in order to avoid the obstacle H, the second body 30 may be controlled so as to move along the movement path Tm.

Referring to FIG. 7, when a second predetermined condition is satisfied based on the increment of each of the two variable distances per unit time, the controller 70 may control the second body 30 so as to move along the shortened path Tc. The second predetermined condition may be the condition in which the first predetermined condition is not satisfied. In other words, the second predetermined condition may be the condition in which the increment of each of the two variable distances per unit time $\Delta Ds1/\Delta t$ or $\Delta Ds2/\Delta t$ is below the predetermined value V (see FIG. 10). In another example, the second predetermined condition may be the condition in which the increment of each of the two variable distances per unit time $\Delta Ds1/\Delta t$ or $\Delta Ds2/\Delta t$ is below a predetermined value V2 (V2<V). The controller 70 may control the second body 30 so as to move along the shortened path Tc when it is estimated that the increment of each of the two variable distances per unit time is below a predetermined reference and there is the shortened path Tc along which the second body 30 follows the first body 10, the shortened path Tc being shorter than the movement path Tm. On the other hand, when it is estimated that the increment of each of the two variable distances per unit time is below the predetermined reference, but there is no shortened path Tc along which the second body 30 follows the first body 10, the shortened path Tc being shorter than the movement path Tm, the controller 70 may control the second body 30 so as to move along the movement path Tm. Thereby, when it is estimated that there is no obstacle that prevents movement, the controller 70 may induce the second body 30 so as to move along the shortened path Tc, which may increase the efficiency and speed of a position following operation.

When the movement path Tm for a predetermined time is a curved path and there is a straight path that interconnects two positions corresponding to the beginning point and the end point of the curved path for the predetermined time, it may be estimated that the shortened path Tc exists. For example, when the movement path Tm for a predetermined time Δt is a curved path, the controller 70 may estimate that the shortened path Tc exists.

Referring to FIG. 7, two distances Ds1 and Ds2 are sensed at one point in time (see FIG. 7(a)) and two distances Ds1' and Ds2' are sensed at one point in time after a unit time Δt (see FIG. 7(b)). In this case, the increments of the two sensed distances per unit time Ds1'-Ds1/Δt and Ds2'-Ds2/Δt are a predetermined value V, whereby the controller 70 may control the second body 30 so as to move along the shortened path Tc, instead of the movement path Tm.

Referring to FIG. 8, two distances Ds1 and Ds2 are sensed at one point in time (see FIG. 8(a)) and two distances Ds1'+a and Ds2' are sensed at one point in time after a unit time At (see FIG. 8(b)). In this case, among the increments of the two sensed distances per unit time Ds1'+a-Ds1/Δt and Ds2'-Ds2/Δt, the increment Ds1'+a-Ds1/Δt is a predetermined value V or more, whereby the controller 70 may control the second body 30 so as to move along the movement path Tm.

Figure 9:
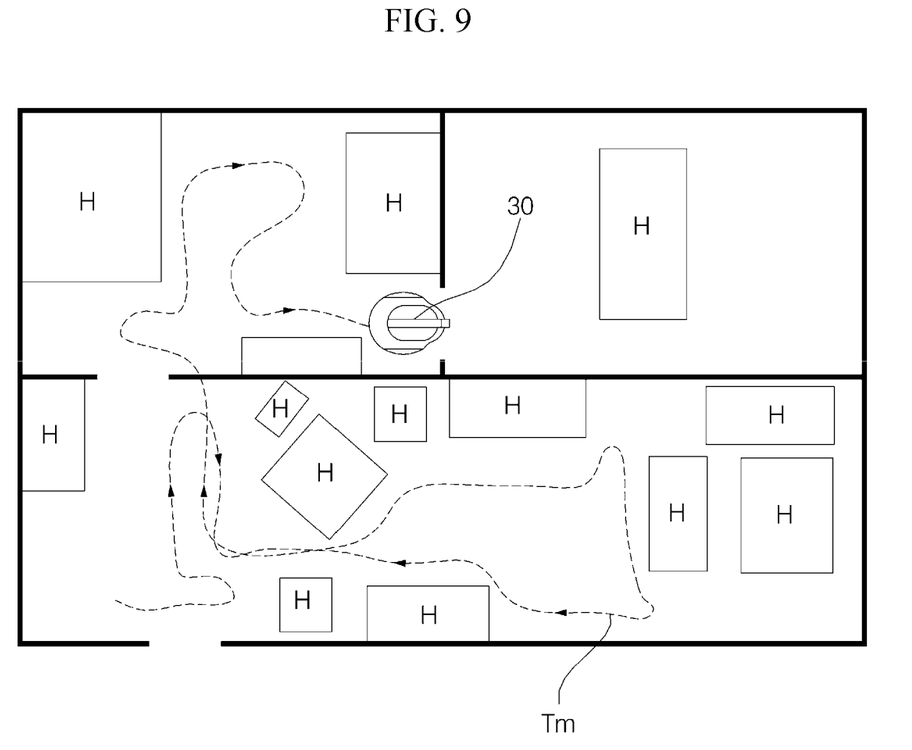
FIG. 9 is a conceptual view illustrating a movement path Tm of the first body 10 in a map and a second body 30, which moves along the movement path Tm.

FIG. 9 illustrates the state in which the second body 30 moves along the movement path Tm of the first body 10 in the map. The controller 70 may estimate the movement path Tm in the map. The map may be stored in the controller 70, or may be stored in a server or another device outside the cleaner. The movement path Tm displayed on the map may be output for the user. The communication module 90 may transmit information regarding the movement path of the first body 10 to the server or the other device. This may allow the user to check the movement path Tm in the map using the information transmitted to the server.

Hereinafter, a method of controlling the cleaner 1 will be described with reference to FIGS. 10 to 13.

Figure 10:
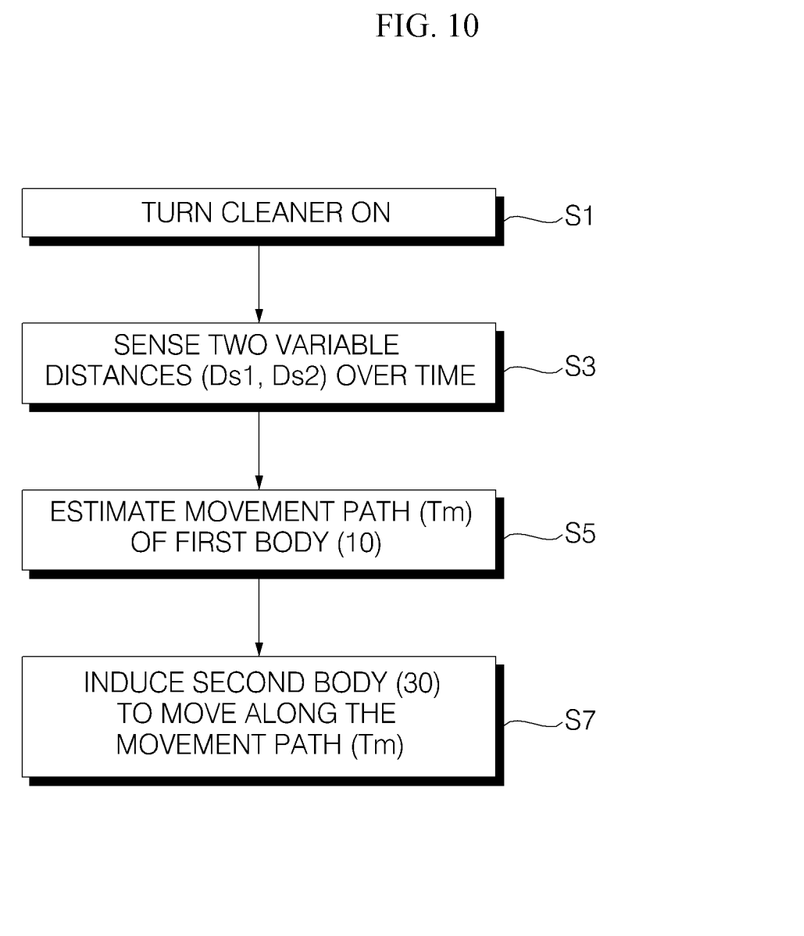
FIG. 10 is a flowchart of a control method according to the embodiment of the cleaner 1 illustrated in FIG. 1.

Referring to FIG. 10, in a control method according to the embodiment, a process S1 of turning the cleaner 1 on is performed. Thereafter, a process S3 of sensing two variable distances over time is performed. Thereafter, a process S5 of estimating the movement path Tm of the first body 10 based on the two variable distances sensed over time is performed. Thereafter, a process S7 of moving the second body 30 along the estimated movement path Tm is performed.

Figure 11:
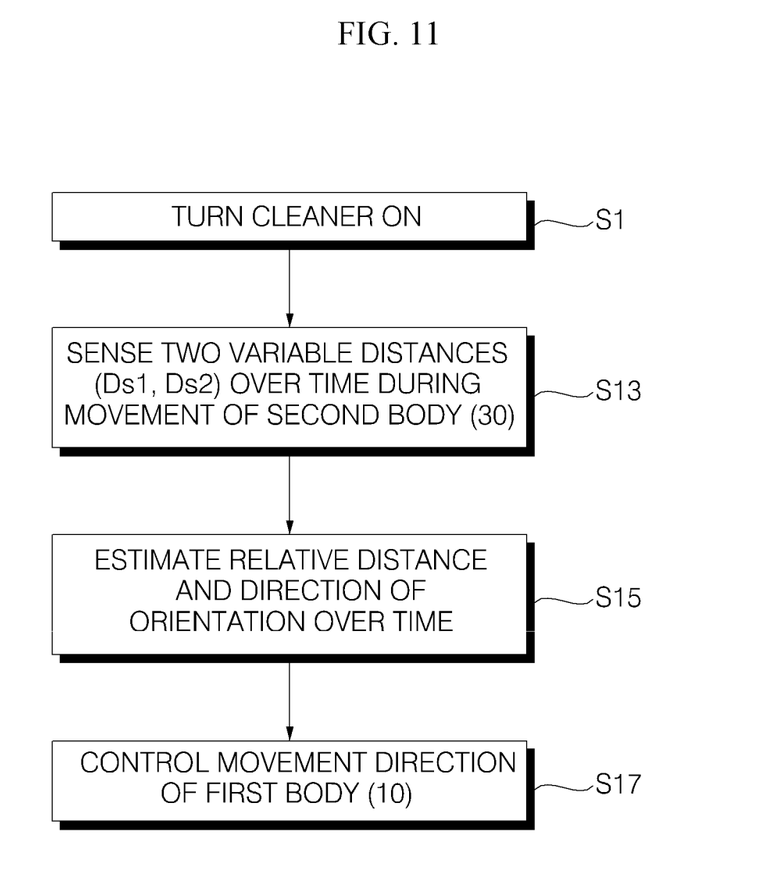
FIG. 11 is a flowchart of a control method according to the first embodiment of the cleaner 1 illustrated in FIG. 3.

Referring to FIG. 11, in a control method according to the first embodiment, after the process S1, a process S13 of sensing the two variable distances over time is performed during movement of the second body 30. Thereafter, a process S15 of estimating the relative distance and the direction of orientation, which vary over time, is performed. Thereafter, a process S17 of controlling the movement direction of the second body 30 based on the relative distance and direction of orientation over time estimated over time is performed.

Figure 12:
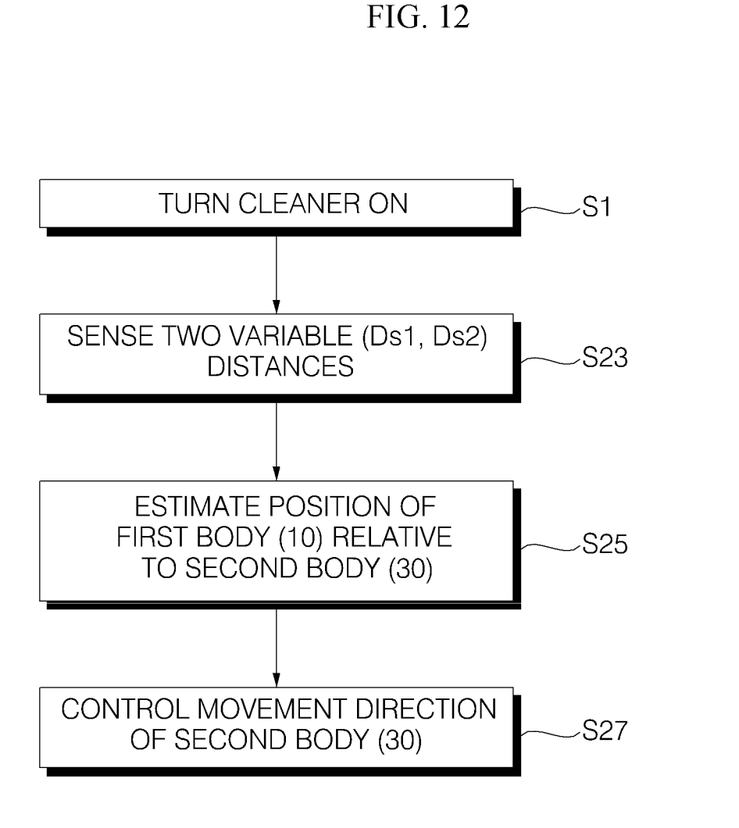
FIG. 12 is a flowchart of a control method according to the second embodiment of the cleaner 1 illustrated in FIG. 5.

Referring to FIG. 12, in a control method according to the second embodiment, after the process S1, a process S23 of sensing the two variable distances is performed. Thereafter, a process S25 of estimating the position of the first body 10 relative to the second body 30 based on the two sensed variable distances is performed. Thereafter, a process S27 of controlling the movement direction of the second body 30 based on the estimated relative position is performed.

Figure 13:
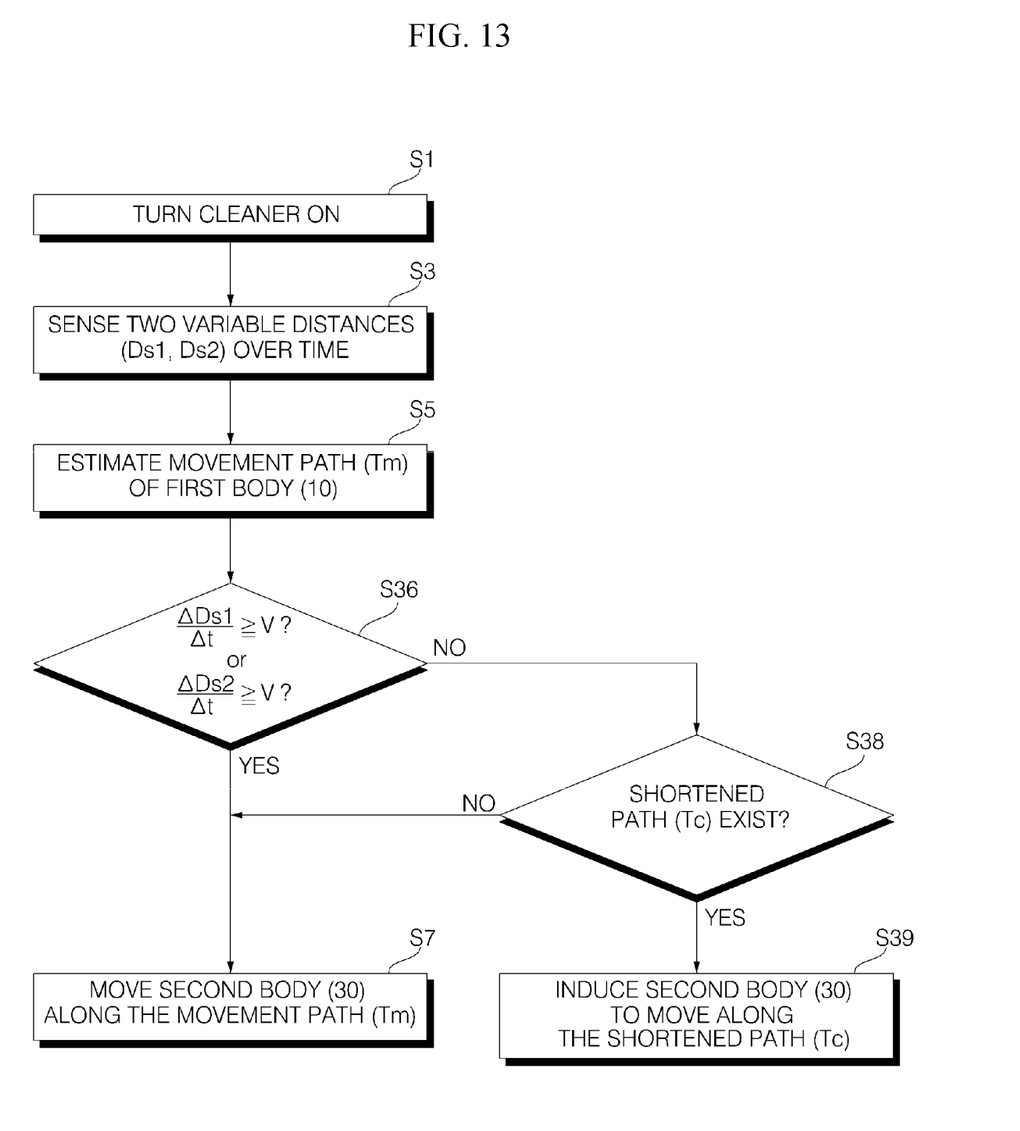
FIG. 13 is a flowchart of a control method according to a third embodiment of the cleaner 1 illustrated in FIGS. 7 and 8.

Referring to FIG. 13, in a control method according to a third embodiment, after the processes S1, S3 and S5, a process S36 of judging whether or not the first predetermined condition is satisfied is performed. When it is judged in the process S36 that the first predetermined condition is satisfied, the process S7 of moving the second body 30 along the movement path Tm is performed. When it is judged in the process S36 that the first predetermined condition is not satisfied, a process S38 of judging whether or not the shortened path Tc, which is shorter than the movement path and along which the second body 30 follows the first body 10 Tm, exists is performed. When it is judged in the process S38 that there is no shortened path Tc, the process S7 is performed. When it is judged in the process S38 that the shortened path Tc exists, a process S39 of moving the second body 30 along the shortened path Tc is performed.

As is apparent from the above description, according to the present invention, in a cleaner having a first body and a second body, it is possible to accurately grasp the position of the first body relative to the second body.

In the present invention, as a result of sensing a variable distance between a first sensor and a second sensor, which are respectively provided on the first body and the second body, the reliability of estimated information may be increased.

Here, any one of the first sensor and the second sensor is provided in a number of two or more, which enables the position of the first body relative to the second body to be more easily detected in real time by triangulation.

In the present invention, the movement path of the first body is estimated, which may not only allow a user to easily check the zone that has been cleaned with reference to a map, but allow the user to receive output information regarding the cleaned zone.

When the second body is controlled so as to follow the movement path of the first body, because no obstacle exists at least in the movement path of the first body, the risk of collision between the second body and the obstacle may be reduced, and the risk of a power cable, a connection hose or the like of the cleaner being entangled by the obstacle may be reduced.

In addition, because the second body moves only along the movement path that has been cleaned, the risk of wheels of the second body or the like being contaminated while passing through the zone that has not yet been cleaned may be reduced, and the possibility of recontamination of the cleaned zone may be reduced.

In addition, when the second body is controlled so as to follow the movement path of the first body, the number of obstacle sensors that assist the second body in avoiding collision with obstacles while following the first body may be reduced. Thus, the cost required for providing obstacle sensors may be reduced while ensuring that the second body is movable while avoiding obstacles.

In addition, because the user may check the movement of the second body along the movement path while performing cleaning using the first body, it is possible to allow the user to repeatedly recognize the zone that has already been cleaned and the zone that has not yet been cleaned, which may reduce redundant cleaning and increase the efficiency of use of the cleaner.

In addition, by estimating the direction of orientation of the first body, it is possible to predict in advance the direction in which the first body is likely to move after the present time and to allow the second body to prepare for the operation of following the first body.

In addition, through the provision of a shortened path Tc, the risk of collision with obstacles may be reduced and the efficiency and speed of following may be increased.

What is claimed is:

1. A cleaner comprising:
   a first body comprising a cleaning unit configured to suction air to be cleaned;
   a second body comprising a driving unit configured to move the second body; and
   a sensing module comprising at least one first sensor disposed on the first body and at least one second sensor disposed on the second body, the at least one first sensor and the at least one second sensor configured to transmit and receive wireless signals between each other, the at least one first sensor having a first number of sensors, the at least one second sensor having a second number of sensors, and at least one of the first number or the second number being at least two; and at least one processor configured to:
determine a first distance between a first pair of sensors consisting of one among the at least one first sensor and one among the at least one second sensor;
determine a second distance between a second pair of sensors, different from the first pair of sensors, consisting of one among the at least one first sensor and one among the at least one second sensor; and
control the driving unit to move the second body to follow the first body based on the first distance and the second distance
wherein the first number of the at least one first sensor is at least two.

2. The cleaner according to claim 1, wherein the at least one first sensor or the at least one second sensor comprises two sensors that are spaced apart from each other in a horizontal direction.

3. The cleaner according to claim 1, wherein the at least one processor is configured to control the driving unit to move the second body to follow the first body based on the first distance and the second distance by:
controlling a direction in which the second body moves based on the first distance and the second distance.

4. The cleaner according to claim 1, wherein the at least one processor is further configured to estimate a movement path of the first body based on a change in at least one of the first distance or the second distance over time.

5. The cleaner according to claim 4, wherein the at least one processor is configured to control the driving unit to move the second body to follow the first body based on the first distance and the second distance by:
controlling the drive unit to move the second body along the estimated movement path of the first body.

6. The cleaner according to claim 1, wherein for a first sensor from among the at least one first sensor and a second sensor from among the at least one second sensor, one of the first sensor or the second sensor comprises a transmitter configured to transmit a radio signal, and an other one of the first sensor or the second sensor comprises a receiver configured to receive the radio signal, and
wherein the at least one processor is configured to determine the first distance and the second distance by transmission and reception of the radio signal.

7. The cleaner according to claim 1, wherein two sensors from among the at least one first sensor are spaced apart from each other on the first body in a left-and-right direction.

8. The cleaner according to claim 7, wherein the at least one processor is configured to control the driving unit to move the second body to follow the first body based on the first distance and the second distance and further based on a distance between the two of the at least two first sensors that are spaced apart from each other on the first body in the left-and-right direction.

9. The cleaner according to claim 1, wherein the at least one processor is further configured to estimate a direction of orientation of the first body based on the first distance and the second distance.

10. The cleaner according to claim 9, wherein the at least one processor is configured to:
determine a plurality of values for the first distance and the second distance corresponding to a plurality of times at which the first distance and the second distance are sensed while the second body is moving;
determine a plurality of values for the direction of orientation of the first body based on the plurality of values for the first distance and the second distance; and
control the driving unit to move the second body to follow the first body based on the plurality of values for the first distance and the second distance and the plurality of values for the direction of orientation.

11. The cleaner according to claim 1, wherein the second number of the at least one second sensor is at least two.

12. The cleaner according to claim 11, wherein two sensors from among the at least one second sensor are spaced apart from each other on the second body in a left-and-right direction.

13. The cleaner according to claim 12, wherein the at least one processor is configured to control the driving unit to move the second body to follow the first body based on the first distance and the second distance and further based on a distance between the two of the at least two second sensors that are spaced apart from each other on the second body in the left-and-right direction.

14. The cleaner according to claim 11, wherein the at least one processor is further configured to estimate a position of the first body relative to the second body based on the first distance and the second distance.

15. The cleaner according to claim 1, wherein the at least one processor is further configured to:
sense a change in any one of the first distance or the second distance over time; and
control the driving unit to move the second body along a movement path of the first body based on a determination that an increment of the change in any one of the first distance or the second distance per unit time exceeds a threshold.

16. The cleaner according to claim 15, wherein the at least one processor is further configured to:
based on a determination that an increment of the change in the first distance and the second distance per unit time does not exceed the threshold and based on a determination of a shortened path along which the second body follows the first body that is shorter than the movement path of the first body, control the driving unit to move the second body along the shortened path to follow the first body.

17. The cleaner according to claim 1, wherein:
the first pair of sensors consists of a first sensor from among the at least one first sensor and a second sensor from among the at least one second sensor, and
the second pair of sensors consists of the first sensor from among the at least one first sensor and a third sensor from among the at least one second sensor.

18. The cleaner according to claim 1, wherein:
the first pair of sensors consists of a first sensor from among the at least one first sensor and a second sensor from among the at least one second sensor, and
the second pair of sensors consists of a third sensor from among the at least one first sensor and the second sensor from among the at least one second sensor.

19. The cleaner according to claim 1, wherein the first body is connected to the second body by a suction hose through which air is configured to be suctioned from the first body to the second body.

20. The cleaner according to claim 1, further comprising a connection unit extending to interconnect the first body and the second body.

* * * * *